US012157076B2

(12) United States Patent
Brewer et al.

(10) Patent No.: US 12,157,076 B2
(45) Date of Patent: Dec. 3, 2024

(54) FRACTIONATION TRAY WITH ADJUSTABLE OPEN AREA FOR CLEANING AND/OR THROUGHPUT CONTROL

(71) Applicant: Crown Iron Works Company, Blaine, MN (US)

(72) Inventors: Stephen Wayne Brewer, Norman, IN (US); Benjamin Wayne Floan, Andover, MN (US); Wade Steven Martinson, Minneapolis, MN (US)

(73) Assignee: CROWN IRON WORKS COMPANY, Blaine, MN (US)

( * ) Notice: Subject to any disclaimer, the term of this patent is extended or adjusted under 35 U.S.C. 154(b) by 111 days.

(21) Appl. No.: 17/273,729

(22) PCT Filed: Sep. 5, 2019

(86) PCT No.: PCT/US2019/049775
§ 371 (c)(1),
(2) Date: Mar. 4, 2021

(87) PCT Pub. No.: WO2020/051349
PCT Pub. Date: Mar. 12, 2020

(65) Prior Publication Data
US 2021/0346818 A1 Nov. 11, 2021

Related U.S. Application Data
(60) Provisional application No. 62/727,371, filed on Sep. 5, 2018.

(51) Int. Cl.
B01D 3/16 (2006.01)
B01D 3/22 (2006.01)
(Continued)

(52) U.S. Cl.
CPC ............... *B01D 3/163* (2013.01); *B01D 3/22* (2013.01); *B01D 3/324* (2013.01); *B01D 3/42* (2013.01); *C11B 1/10* (2013.01)

(58) Field of Classification Search
CPC .......... B01D 3/163; B01D 3/22; B01D 3/324; B01D 3/42
See application file for complete search history.

(56) References Cited

U.S. PATENT DOCUMENTS 2,705,699 A * 4/1955 Bresee ..................... B01D 3/26
202/160
3,162,701 A 12/1964 Joor, II
(Continued)

FOREIGN PATENT DOCUMENTS

DE 19602106 A1 7/1997

OTHER PUBLICATIONS

U.S. Appl. No. 62/585,851.*
(Continued)

Primary Examiner — Jonathan Luke Pilcher
(74) Attorney, Agent, or Firm — Fredrikson & Byron, P.A.

(57) ABSTRACT

A fractionation column can be used to separate a liquid containing multiple components into its constituent components based on vapor pressure. While the fractionation column may be designed for certain operational performance, the operational characteristics may change, for example, due to changed flow rates through the column and/or fouling in the column. In some examples, a fractionation column is described that includes a fractionation tray formed of multiple tray decks that move relative to each other. The tray decks can have apertures that move relative to each other between a position in which there is a comparatively large amount of open area through the fraction- (Continued)

ation tray to a position in which there is a comparatively small amount of open area through the fractionation tray. Movement of the trays can control turndown and/or clear fouling buildup on the tray surface.

15 Claims, 10 Drawing Sheets

(51) Int. Cl.
  *B01D 3/32* (2006.01)
  *B01D 3/42* (2006.01)
  *C11B 1/10* (2006.01)

(56) References Cited

U.S. PATENT DOCUMENTS

| | | | |
|---|---|---|---|
| 3,268,420 A * | 8/1966 | Webber | B01D 3/4238 700/270 |
| 4,288,297 A | 9/1981 | Karnofsky et al. | |
| 4,353,837 A | 10/1982 | Barns | |
| 4,659,345 A | 4/1987 | Mojonnier | |
| 4,732,582 A * | 3/1988 | Mojonnier | B01D 19/0015 96/198 |
| 5,468,425 A | 11/1995 | Nutter | |
| 7,540,476 B2 | 6/2009 | Pilling et al. | |
| 7,540,477 B2 | 6/2009 | Fischer et al. | |
| 7,624,972 B2 | 12/2009 | Trompiz | |
| 7,708,258 B2 | 5/2010 | Pilling et al. | |
| 7,770,873 B2 | 8/2010 | Pilling et al. | |
| 11,260,317 B2 * | 3/2022 | Nieuwoudt | B01D 3/141 |
| 2012/0043196 A1 * | 2/2012 | De Arruda Aniz | B01D 3/163 202/158 |
| 2014/0252663 A1 | 9/2014 | Giese et al. | |
| 2018/0070608 A1 | 3/2018 | Kellens et al. | |
| 2021/0178282 A1 * | 6/2021 | Nieuwoudt | B01D 3/4211 |
| 2022/0168663 A1 * | 6/2022 | Nieuwoudt | B01D 3/20 |

OTHER PUBLICATIONS

Extended European Search Report for European Application No. EP19856868.5, mailed Apr. 28, 2022, 7 pgs.
International Patent Application No. PCT/US2019/049775, "International Search Report and Written Opinion mailed Nov. 15, 2019", 10 pages.

* cited by examiner

FRACTIONATION TRAY WITH ADJUSTABLE OPEN AREA FOR CLEANING AND/OR THROUGHPUT CONTROL

CROSS-REFERENCE

This application is a 35 U.S.C. 371 national stage filing from International Application No. PCT/US2019/049775, filed Sep. 5, 2019, which claims the benefit of U.S. Provisional Patent Application No. 62/727,371, filed Sep. 5, 2018. The entire contents of both of these applications are incorporated herein by reference.

TECHNICAL FIELD

This disclosure relates to fractionation tray configurations and fractionation columns, such as distillation columns and stripping columns, incorporating such fractionation trays.

BACKGROUND

Vapor-liquid contact trays are used in mass transfer or exchange columns to facilitate contact between, for example, upwardly flowing vapor streams and downwardly flowing liquid streams. The trays are conventionally horizontally disposed within a fractionation column to provide a horizontal surface across which a liquid stream can flow. The trays are typically formed from a solid sheet-like material and contain a plurality of apertures, which allows vapor to flow upwardly through the tray for interaction with liquid flowing across the top surface of the tray. In trays known as sieve trays, the apertures are sized small enough so that during operation of the column the pressure of the vapor passing upwardly through the apertures restricts or prevents liquid from passing downwardly through the apertures. In other types of trays, movable valves or stationary structural elements such as bubble caps can be provided over the apertures to seal against the downward passage of liquid.

In practice, vapor-liquid contact trays, which may also be referred to as fractionation trays, are designed for particular target operating conditions (e.g., temperature and pressure) and flow rates. For example, the size, number, and placement of apertures through the tray may be selected based on a target liquid feed rate and a target gas feed rate to the column. Once installed in a facility, however, actual operating conditions for the column may vary from the design target parameters. For example, flow rates to the column may vary based on production needs of the facility in which the column is installed. Further, if undesired fouling occurs inside of the column during operation, the fouling may plug one or more tray apertures, potentially impacting internal flow dynamics.

SUMMARY

In general, this disclosure is directed to fractionation tray configurations, columns incorporating fractionation trays, and method of using such fractionation trays and columns. In some examples, a fractionation tray according to the disclosure is configured with multiple overlapping tray decks that are movable relative to each other. For example, the fractionation tray can have a first tray deck and a second tray deck that each have apertures separated by blanking sections. The blanking sections may be regions of material (e.g., metal) that are unapertured. The first and second tray decks may move relative to each other to adjust the alignment of the apertures of the two tray decks relative to each other. For example, the trays may move relative to each other from a maximum throughput position in which apertures of the two tray decks are fully aligned (e.g., allowing flow through the entire open area of the apertures of the top tray deck) to a maximum turndown position in which apertures of the two tray decks are fully covered by blanking sections of the other tray, and optionally any position therebetween.

Configuring a fractionation tray with multiple tray decks whose open areas move relative to each other can be useful for a variety of reasons. The variable open area provided by the adjustable tray decks can provide flexibility for increasing or decreasing flow rates through the column depending on the operational needs of the facility in which the tray deck is installed. As another example, in instances where the fractionation tray is used in a fouling service (e.g., where the material being processed has a tendency to build up over and/or plug the apertures of the tray), the movement of the tray decks relative to each other may have a cleansing or defouling impact. For example, when foulant builds-up around the apertures due to rising vapors carrying entrained material, the foulant may begin bridging over and/or completely plugging the apertures of the tray. By configuring one tray deck to move or slide relative to another tray deck, the relative movement of the tray decks may cause a scrubbing or shearing action on the build-up foulant. In turn, this can release the foulant and reopen the apertures of the tray deck.

Although a fractionation tray according to the disclosure can be implemented in a number of different configurations, in some examples, multiple of the fractionation trays are installed in series in a fractionation column. Each fractionation tray may be sealed to an inner surface of the column housing to define distinct gas spaces between adjacent trays. In some applications, the pressure of the adjacent gas spaces is monitored and the relative open area of the fractionation tray between the adjacent gas spaces is controlled to maintain a target differential pressure. In this way, the adjustable open area of the fractionation tray may be dynamically adjusted based on operating conditions inside of the column.

In one example, a fractionation column is described that includes a column housing and a plurality of fractionation trays. The column housing has a feed inlet, a liquid outlet, and a gas outlet. The plurality of fractionation trays are contained in the column housing and are vertically spaced from each other. The example specifies that one or more of the fractionation trays include a first tray deck and a second tray deck. The first tray deck includes apertures through which vapor rising in the column housing is configured to pass for contacting liquid flowing across and/or through the tray deck. The second tray deck is positioned adjacent to the first tray deck. The second tray includes at least one blanking section devoid of apertures that is movable relative to the apertures of the first tray deck between a covered position in which the apertures of the first tray deck are covered by the at least one blanking section and an uncovered position in which the apertures of the first tray deck are not covered by the at least one blanking section.

In another example, a method is described that includes introducing a feed liquid and a gas into a fractionation column containing a plurality of vertically spaced fractionation trays. The method involves flowing the feed liquid across a top surface of at least one fractionation tray while causing the gas to flow upwardly through apertures in the tray. The example specifies the tray includes a first tray deck and a second tray deck positioned adjacent to the first tray deck and being movable relative thereto. The example method also involves moving the second tray deck relative to the first tray deck to clean the apertures and/or adjust an open area of the apertures.

The details of one or more examples are set forth in the accompanying drawings and the description below. Other features, objects, and advantages will be apparent from the description and drawings, and from the claims.

DETAILED DESCRIPTION

In general, this disclosure is directed to fractionation trays, fractionation columns containing one or more fractionation trays, and processes using fractionation trays. In some examples, a fractionation tray according to disclosure is formed of multiple overlapping segments or sections that move relative to each other. For example, the fractionation tray may be formed from at least two sheets of material (e.g., metal) each having apertures formed in the sheeting. The two sheets of material may be movable relative to each other to adjust the relative alignment of respective apertures between the two sheets. In some configurations, the sheets may be moved between a position in which the apertures in each sheet are aligned with each other (e.g., allowing flow through an entire cross-section of an aperture) to a closed position in which the apertures are partially or fully offset from each other (e.g., causing partial or full blocking of flow through the cross-section of an aperture). By configuring a fractionation tray with movable sections relative to each other, the throughput capacity of the tray may be adjusted by adjusting the open area of the tray. Further, the relative movement of the trays may provide a cleaning action to remove fouling that may buildup on the tray over extended service.

Figure 1:
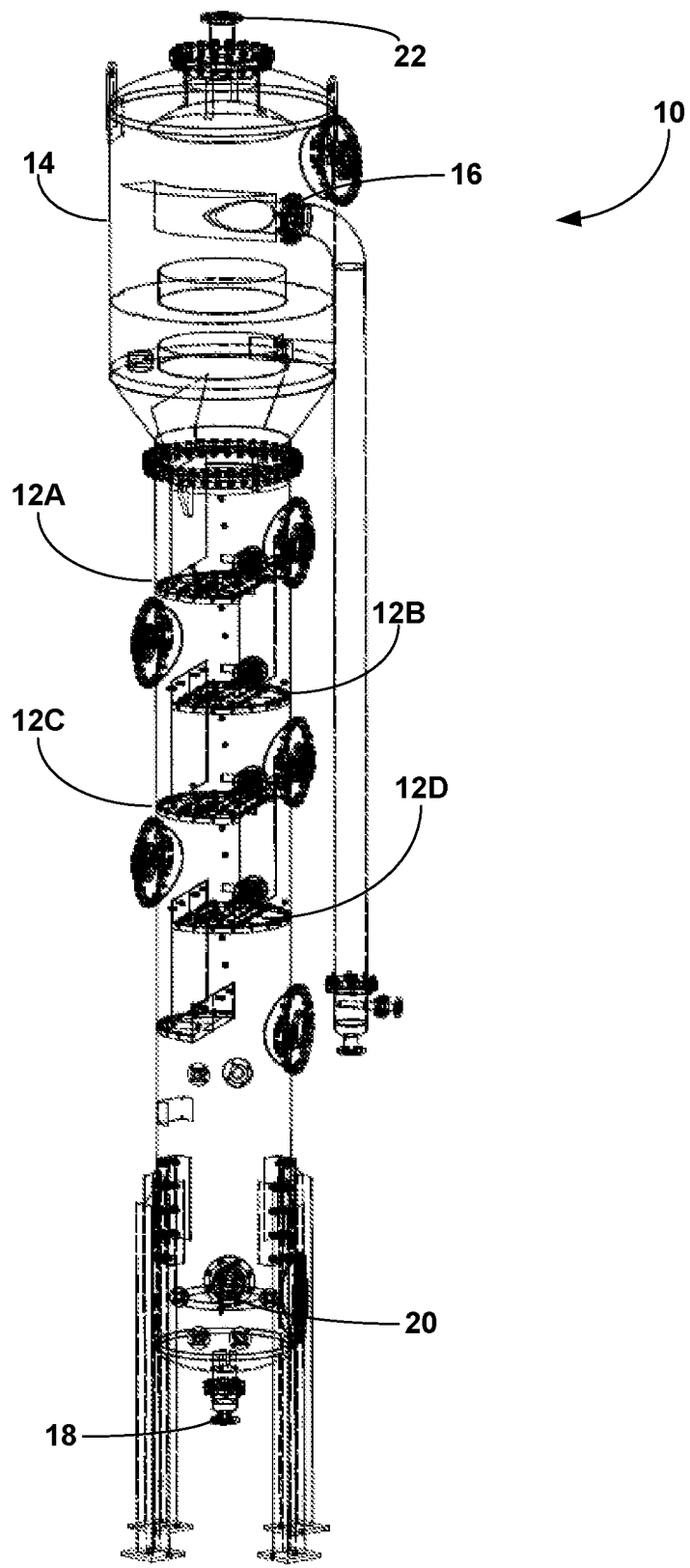
FIG. 1 is a perspective view of an example fractionation column according to the disclosure.

FIG. 1 is a perspective illustration of an example fractionation column 10 that includes at least one fractionation tray according to the disclosure, which in the example of FIG. 1 is illustrated as having a plurality of fractionation trays 12A-12D (collectively referred to as "fractionation tray 12"). Fractionation trays 12A-12D are vertically spaced from one another inside of a column housing 14. Fractionation column 10 can have a feed inlet 16 that receives a liquid to be fractionated inside of the fractionation column, a feed outlet 18 configured to discharge a higher vapor pressure fraction of the feed liquid, a gas inlet 20 configured to introduce a gas (e.g., steam) into the column housing, and a gas outlet 22 configured to discharge a lower vapor pressure fraction of the feed liquid. Although FIG. 1 illustrates an example stripping tower configuration of a fractionation column, other types of fractionation column configurations can be used without departing from the scope of the disclosure. For example, fractionation column 10 may be implemented as a distillation column, which may or may not have one or more sidestream draws and/or one or more sidestream recirculation loops for adding thermal energy to or withdrawing thermal energy from different sections of the column.

Independent of the specific configuration of fractionation column 10, the column may contain at least one fractionation tray formed of multiple tray decks movable relative to each other as described in greater detail below. For example, fractionation column 10 may include multiple (e.g., two, three, four, or more) fractionation trays 12 that are arranged vertically spaced from each other in column housing 14, with each tray being informed of multiple tray decks movable relative to each other. In some examples, all fractionation trays in fractionation column 10 are configured with movable tray decks as described herein. In other examples, at least one fractionation tray in fractionation column 10 is a traditional tray without movable tray decks (e.g., sieve tray, fixed or moving valve tray) and is used in combination with a tray configuration according to the present disclosure.

Figure 2:
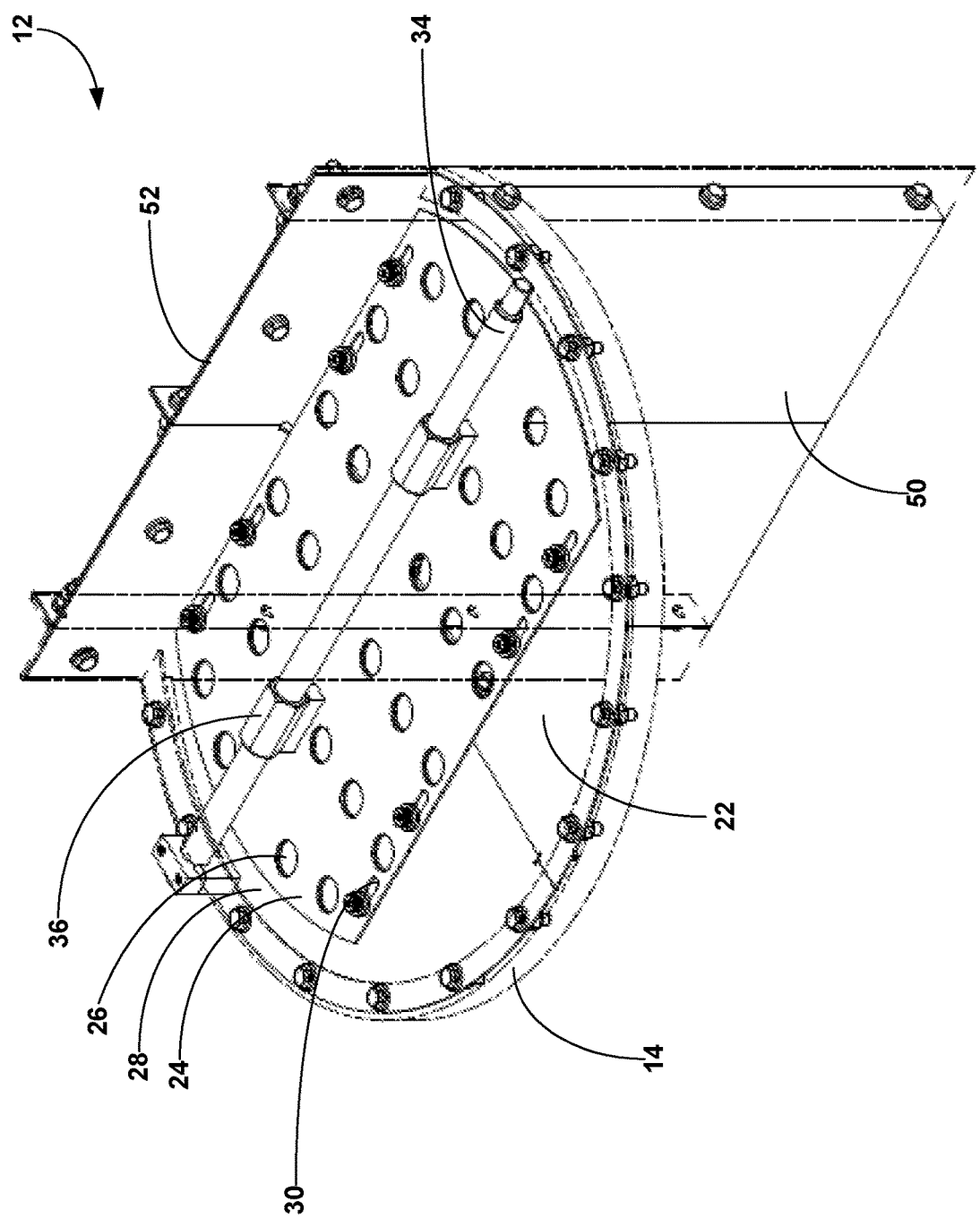
FIG. 2 is a perspective view of an example fractionation tray that can be used in the fractionation column of FIG. 1

FIG. 2 is a perspective of example fractionation tray 12 that may be used in fractionation column 10 according to FIG. 1. As shown in this example, fractionation tray 12 includes a first tray deck 22 and a second tray deck 24. Second tray deck 24 is positioned adjacent to first tray deck 22 and is movable relative thereto. In some examples, second tray deck 24 is positioned in contact with first tray deck 22 (e.g., such that a top surface of the first tray deck 22 contacts a bottom surface of the second tray to 24). In other examples, second tray deck 24 is positioned adjacent to first tray deck 22 without directly contacting the tray deck (e.g., with a small gap there between, such as a less than 5 mm, or less than 1 mm). In either case, both the first tray deck 22 and the second tray deck 24 may be in sufficiently close proximity such that, in combination, the tray decks collectively form a fractionation tray. For example, the first tray deck 22 and the second tray deck 24 may be in sufficiently close proximity that only a minimal amount of vapor and/or liquid (e.g., substantially none) can pass through the gap between the two trays.

In general, first tray deck 22 and/or second tray deck 24 may define corresponding apertures 26 and blanking sections 28 that are movable relative to each other to adjust the open area through the apertures. For example, first tray deck 22 may include a plurality of apertures 26, which may be openings through which the rising vapor in column housing 14 (FIG. 1) can pass upwardly through fractionation tray 12. Second tray deck 24 may in turn include one or more blanking sections that can move in relation to the one or more (e.g., multiple of, all of) the apertures 26 of the first tray deck 22. The blanking sections 28 may move from a position that is partially or fully offset from the apertures 26 that the blanking sections are configured to cover to another position where the blanking sections are partially or fully enclosing the apertures. In general, the blanking section or sections of a tray deck may be regions of tray deck material that are devoid of apertures (e.g., such that rising vapor cannot pass through the blanking section). While the foregoing example has described first tray deck 22 as having apertures 26 and second tray deck 24 as having blanking sections 28, first tray deck 22 may have blanking sections in addition to or in lieu of having apertures 26 and, similarly, second tray deck 24 may have apertures in addition to or in lieu of having blanking sections. Thus, features described as being associated with first tray deck 22 herein may be implemented on second tray deck 24 and, correspondingly, features described as being associated with second tray deck 24 herein may be implemented on first tray deck 22 without departing from the scope of disclosure.

In one example, for instance, first tray deck 22 and second tray deck 24 each have apertures and blanking sections. The blanking sections in such configurations may be regions of tray deck material between adjacent apertures. When so configured, the apertures of the first tray deck 22 and the apertures of second tray deck 24 may be moved relative to each other between a position in which corresponding apertures are partially or fully axially aligned (e.g., such that rising vapor can pass through the cross-sectional area of the aligned apertures). Further, the apertures of first tray deck 22 and the apertures of second tray deck 24 may be moved relative to each other between one or more additional positions in which the apertures of one tray deck are partially or fully covered by blanking sections of an adjacent tray deck. In this way, the open area through fractionation tray 12 may be adjusted by controlling the position of the apertures of the two tray decks relative to the blanking sections of the tray decks.

Figure 3:
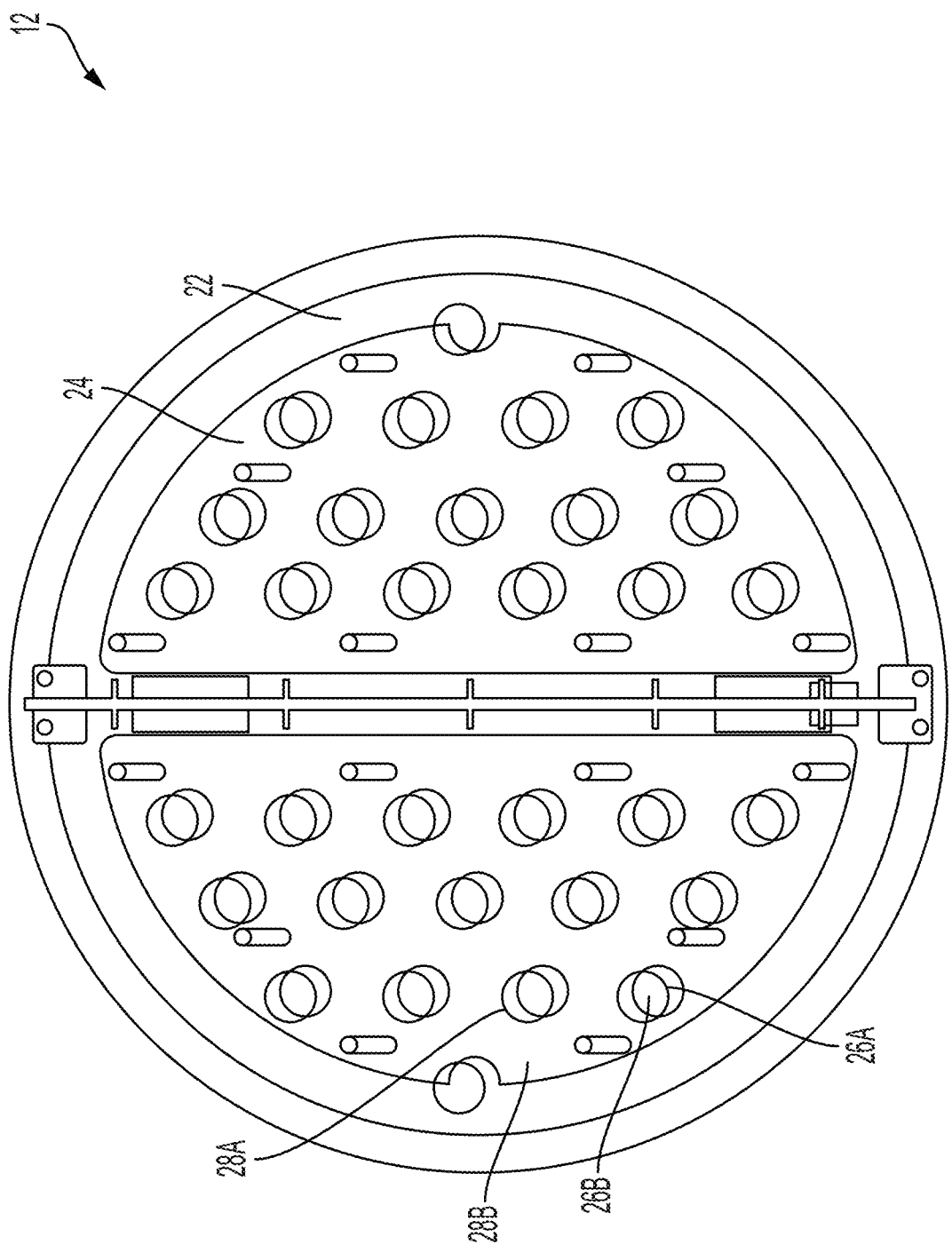
FIG. 3 is a top view showing an example arrangement of overlapping tray decks that can be used on the fractionation tray of FIG. 2.

FIG. 3 is a top view showing an example arrangement of overlapping tray decks that each have apertures and blanking sections and that can be used to form fractionation tray 12. As shown in this example, first tray deck 22 has a plurality of apertures 26A and corresponding blanking sections 28A that are regions of tray deck material separating adjacent apertures. Further, second tray deck 24 has a plurality of apertures 26B and corresponding blanking sections 28B that are regions of tray deck material separating adjacent apertures. In the illustrated configuration of FIG. 3, first tray deck 22 has the same number of apertures 26A as the number of apertures 26B provided by second tray deck 24. When so configured, the apertures 26A of the first tray deck 22 may or may not be the same size and/or shape as the apertures 26B of the second tray deck 24. In the illustrated configuration, however, there is a one-to-one correspondence between apertures 26A of the first tray deck 22 and apertures 26B of the second tray deck 24. In other examples, the number and/or size and/or shape of apertures may vary between first tray deck 22 and second tray deck 24.

Figure 4:
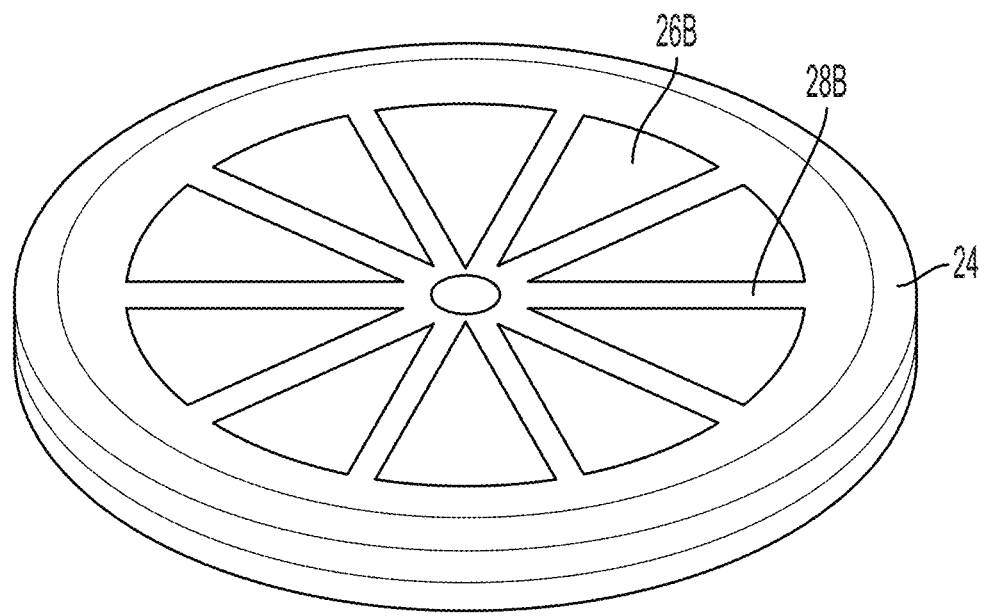
FIGS. 4 and 5 illustrate alternative tray deck configurations that can be used to form a fractionation tray according to disclosure.
Figure 5:
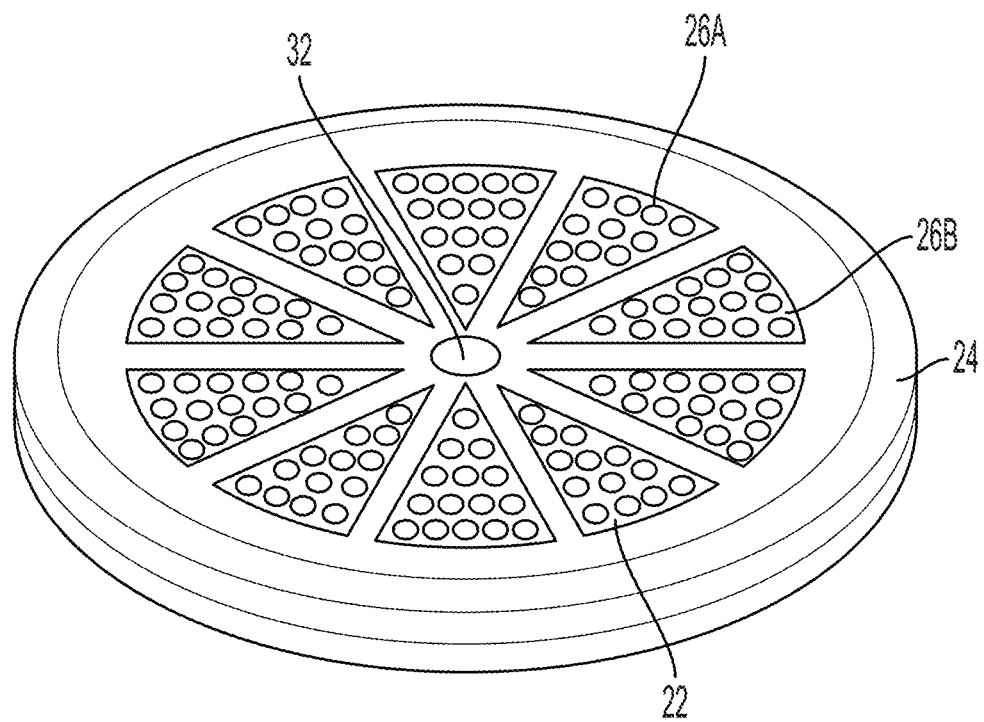

For example, FIGS. 4 and 5 illustrate alternative tray deck configurations that can be used to form a fractionation tray according to disclosure. FIG. 4 is a perspective view of an example tray deck (e.g., second tray deck 24) that has wedge-shaped apertures 26B separated by radially extending blanking sections 28. FIG. 5 is a perspective view of the example tray deck of FIG. 4 installed over an example sieve tray (e.g., first tray deck 22) that has circular apertures 26A and blanking sections 28A between adjacent apertures. In this configuration, apertures 26A may be arranged on the tray deck in wedge-shaped sections corresponding to wedge-shaped apertures 26B. Accordingly, blanking sections 28B from the example tray deck of FIG. 4 may be aligned with blanking sections 28A of the corresponding sieve tray when desiring maximum aperture open area but may be moved to partially or fully cover some or all of the apertures 26A, e.g., when less open area is desired.

Features described as tray deck apertures herein can have any suitable size and/or shapes. In different examples, a tray deck aperture may have a polygon shape (e.g., square, rectangle, triangle), an arcuate shape (e.g. circle, oval), or combinations of polygon and arcuate shapes. Further, as discussed with respect to FIGS. 3 and 5, the apertures 26A through first tray deck 22 in the apertures 26B through second tray deck 24 may be the same size and/or shape or may have a different size and/or shape. In some configurations, each aperture extending through a tray decks has a cross-sectional area less than 50 $cm^2$, such as less than 25 $cm^2$. As discussed in greater detail below with respect to FIG. 10, first tray deck 22 and/or second tray deck 24 may have apertures 26A and/or 26B, respectively, of different cross-sectional area at different locations across the tray deck.

While the size and shape of features described as blanking sections herein may also vary, a tray deck may or may not have a greater cumulative area of blanking sections than apertures. For example, the cumulative open area of the apertures through the tray deck may be less than half the overall cross-sectional area of the tray deck, resulting in the blanking section area of the tray deck being greater than the open area of the tray deck. In either case, the region of blanking section of one tray deck that moves to open and/or close and aperture of another tray deck may be larger than that aperture. As a result, the blanking section may partially or fully close the aperture, e.g., depending on the relative position of the two tray decks.

In general, first tray deck 22 and second tray deck 24 may move relative to each other to adjust the relative positions of the apertures and blanking sections. Depending on the configuration of apertures and blanking sections of the respective tray decks, the open area of the apertures of one tray deck may be fully open, partially closed by blanking sections of a corresponding tray deck, or fully closed by blanking sections of a corresponding tray deck. For example, one tray deck may be movable relative to another tray deck to provide a continuous range of open area adjustment between a position in which the apertures of one tray are 100% open (e.g., fully aligned with apertures of the other tray deck) to a position in which the apertures are 0% open (e.g., fully aligned with blanking sections of the other tray deck so as to be close by the blanking sections). The open area may be continuously adjustable in that the overlap between apertures and blanking sections may be set to any position between fully open and fully closed.

To control the relative positioning of the apertures and blanking sections of respective tray decks, first tray deck 22 and second tray deck 24 may be movable relative to each other. In some examples, one tray deck is configured to move laterally (e.g., side-to-side) across the cross-section of column housing 14 relative to a stationary tray to control the relative position of the two trays. For example, with reference to FIG. 2, first tray deck 22 is shown as being a stationary or unmovable tray. By contrast, second tray deck 24 is illustrated as being sliding the attached to first tray deck 22. In this configuration, second tray deck 24 can move side-to-side along one or more slots 30 relative to first tray deck 22 to adjust the relative position of the two trays.

As another example, first tray deck 22 and second tray deck 24 may be rotationally movable relative to each other. For example, with reference to FIG. 5, first tray deck 22 is again shown as being a stationary or unmovable tray. By contrast, second tray deck 24 is illustrated as being rotationally attached to first tray deck 22 about an axial attachment 32. In this configuration, second tray deck 24 can move rotationally relative to first tray 22 to adjust the relative position of the two trays.

To control the movement of first tray deck 22 and second tray deck 24 relative to each other, fractionation column 10 may include one or more actuators. For example, each fractionation tray 12 may include an actuator associated with that tray, with the actuator being configured to move one tray deck (e.g., second tray deck 24) relative to the other tray deck. In different examples, the actuator may move axially back and forth along a direction of tray movement or may be rotationally driven to translate rotational movement into linear movement. In the example of FIG. 2, fractionation tray 12 is illustrated as including a shaft 34 that is connected to the movable tray (e.g., second tray deck 24) and configured to control movement of the tray relative to the stationary tray (e.g., first tray deck 22). Shaft 34 can extend through the wall of column housing 14 (e.g., via a port formed in the wall) to connect to an actuator located outside of the column housing.

When configured with shaft 34, rotational movement of the shaft can translate into linear movement of the movable tray relative to the stationary tray. For example, shaft 34 may be a threaded drive that is screwed in the movable tray (e.g., second tray deck 24 in the example of FIG. 2), e.g., one or more unthreaded nuts secured to the tray. As shaft 34 turns, the nuts may move along the length of the shaft in a direction dictated by the rotational direction of movement. As another example, shaft 34 may carry a circular gear (e.g., pinion) that engages a linear gear (e.g., rack) secured to the movable tray, or vice versus. Rotation of the pinion relative to the rack can operate to translate rotational motion into linear motion. In either case, shaft 34 may be operatively connected to the movable tray such the movable tray can translate linearly relative to the shaft as the shaft rotates.

Figure 6:
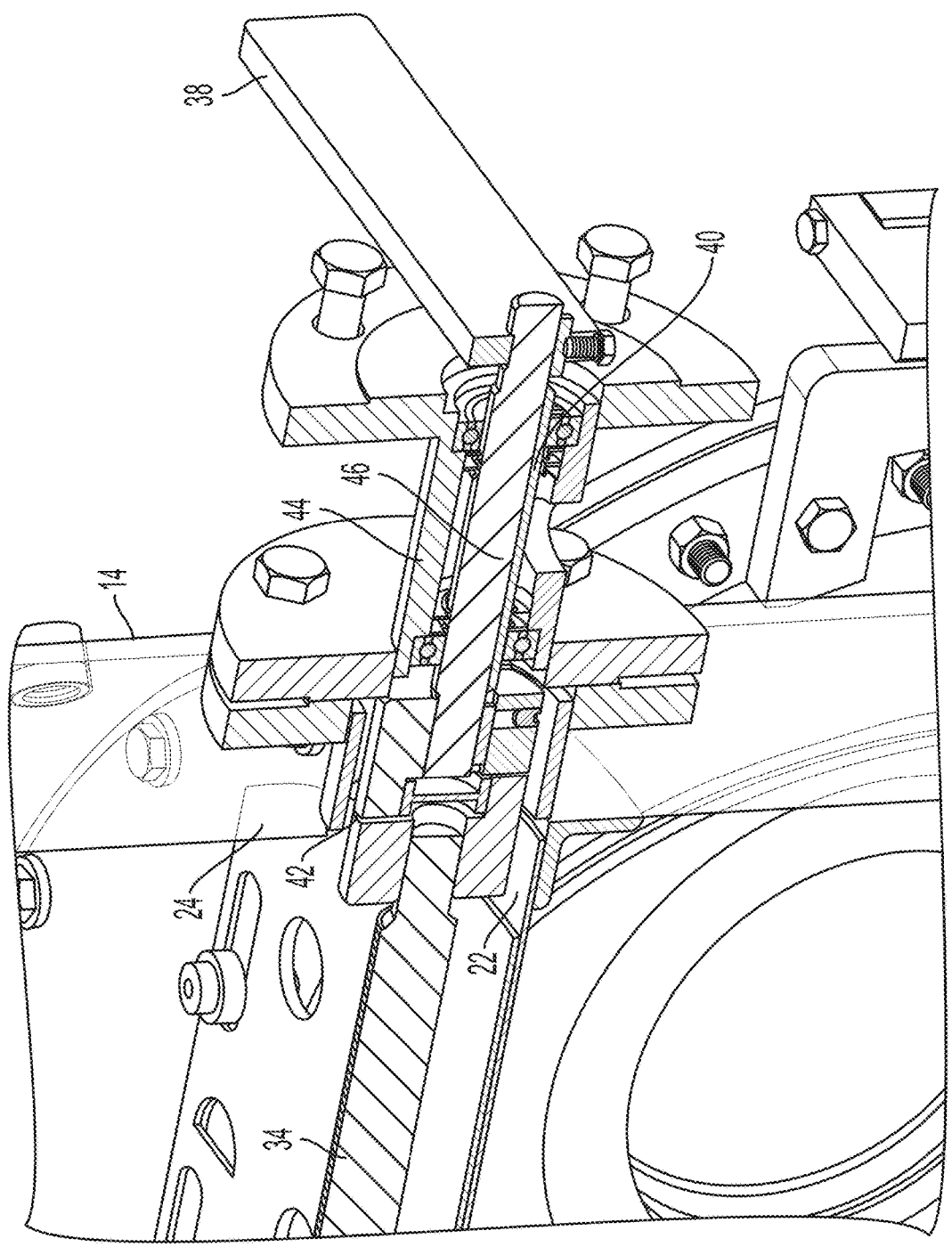
FIG. 6 is a sectional view of an example actuator configuration that can be used for the example fractionation tray of FIG. 2.
Figure 7:
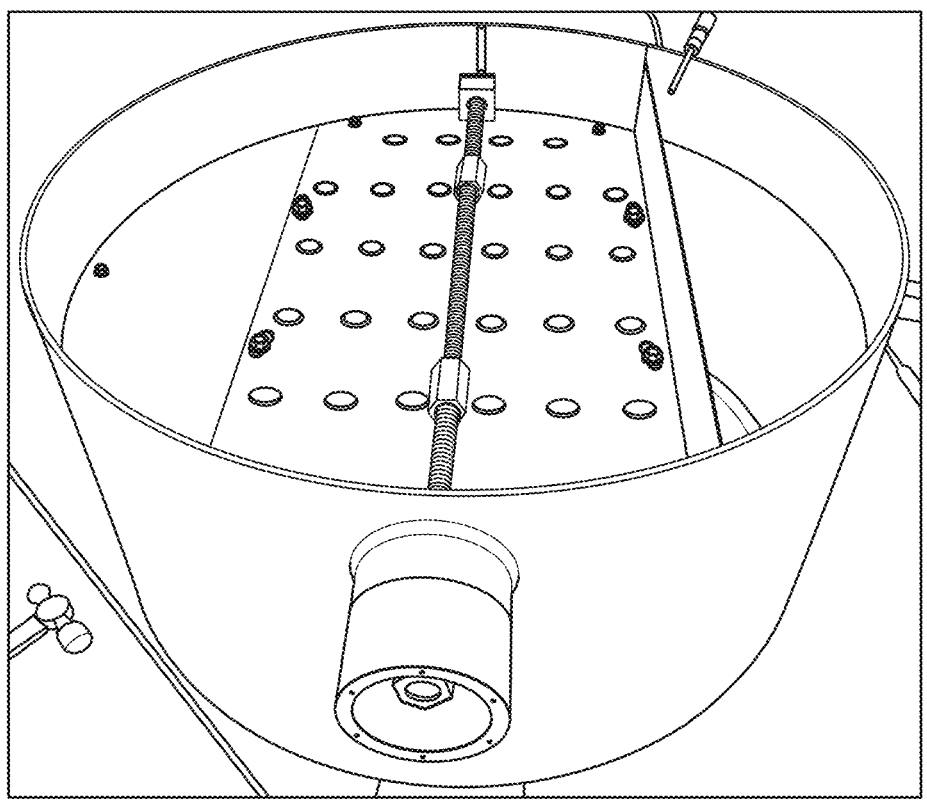
FIG. 7 is a perspective illustration of an example implementation of a fractionation tray according to FIG. 2.

To connect shaft 34 inside of column housing 14 to an external actuator, the shaft may extend externally through column housing 14 and connect with the external actuator. FIG. 6 is a sectional view of an example actuator configuration that can be used for fractionation tray 12. As shown in this example, second tray deck 24 is movably connected to a shaft that extends outside of column housing 14 to an external actuator 38. Actuator 38 is illustrated as a handle graspable by a human operator to manually adjust the positioning of one tray relative to another. In other configurations, actuator 38 may be powered actuator (e.g., driven by electrical and/or pneumatic energy) that receives control signals from a controller for adjusting the position of the tray decks relative to each other.

In some examples, shaft 34 that is movably connected to second tray deck 24 is a single, integral shaft member extends from the tray outside of column housing 14 to connect to actuator 38. In other examples, the shaft is implemented using two or more sections of shaft members. For example, FIG. 6 illustrates second tray deck 24 being movably connected to a first shaft 40 that extends externally to column housing 14 and a second shaft 34 that is internal to the column housing. First shaft 40 and second shaft 34 may be joined together via a coupling region 42, which may be inside of or outside of column housing 14. In either case, a shaft housing 44 may extend external to column housing 14 and may contain one or more seals 46 that surround a shaft member between second tray deck 24 and actuator 38. The one or more seals, which are illustrated as being implemented with four in the specific example of FIG. 6, can reduce or eliminate fluid bypass around the shaft to an external environment.

To connect external shaft 40 to internal shaft 34, the external shaft may be configured to move axially within shaft housing 44 to engage a terminal end of internal shaft 34. Once engaged, a locking screw or other locking member may be used to secure the position of external shaft 40 inside of shaft housing 44 to maintain the engaged position of the external shaft with the internal shaft.

Independent of the specific configuration of shaft 34 and actuator 38, the arrangement used to control the position of first tray 22 relative to second tray deck 24 may include a positioning sensor configured to measure a position of the actuator and, correspondingly, of the movable tray controlled by the actuator relative to the stationary tray. In various examples, the positioning sensor may be an optical sensor, an electromagnetic sensor (e.g., Hall Effect sensor), or a mechanical sensor. In some examples, the positioning sensor measures movement of shaft 34 and/or actuator 38, e.g., by counting rotations (partial and/or full) of the shaft and/or actuator. The positioning sensor may output a signal (e.g., an electrical signal) to a controller and/or user interface providing an indication of an amount of movement of shaft 34 and/or actuator 38, which correspondingly can indicate a relative position of second tray deck 24 to first tray deck 22. Additionally or alternatively, the positioning sensor may be coupled (e.g., mechanically) to a gauge or other visualization feature to indicate a relative position of second tray deck 24 to first tray deck 22. In either case, the relative position of second tray deck 24 to first tray deck 22 may indicate the amount of open area through fractionation tray 12.

With further reference to FIG. 2, first tray deck 22 is illustrated as being secured to column housing 14 while second tray deck 24 is illustrated as having a smaller cross-sectional area than the first tray deck and being inset from the column housing. First tray deck 22 may be secured to column housing 14 using a variety of fixation techniques. In some examples, first tray deck 22 is secured to the column housing 14 using mechanical fixation elements, such as bolts and nuts. In other configurations, first tray deck 22 is secured to column housing 14 by welding the tray deck to the internal surface of the column housing. Welding first tray deck 22 to an interior of column housing 14 can be useful to create a fluid-tight seal between the perimeter of the tray deck and column housing. In either case, first tray deck 22 may or may not be sealed to the column housing 14 about at least the portion of its perimeter such that fluid (e.g., gas, liquid) cannot bypass the seal perimeter. For example, first tray deck 22 may be sealed to column housing 14 from the downcomer associated with the tray deck about its entire perimeter. Second tray deck 24 may be inset from column housing 14 a separation distance that allows the tray deck to move relative to the column housing wall and, correspondingly, the underlying stationary tray deck. As a result, the second tray deck 24 may not be sealed to the column housing.

While fractionation tray 12 has generally been described as having first tray deck 22 and second tray deck 24, it should be appreciated that a fractionation tray according to the disclosure is not limited to having two tray decks. For instance, in another example implementation, fractionation tray 12 may be formed of three tray decks: an upper movable tray deck, a lower movable tray deck, and a stationary middle deck. The upper and lower movable tray decks may be configured and movable as described above in connection with second tray deck 24, while the middle stationary deck may be configured as described above in connection with first tray deck 22.

Configuring fractionation tray 12 with upper and lower movable tray decks may be useful to control and/or inhibit fouling. In operation, material being processed in fractionation column 10 may have a tendency to deposit solid residue inside the column. The deposited solid residue, or foulant, may initially build at or around a perimeter edge of one or more apertures passing through fractionation tray 12 (e.g., on a top and/or bottom surface of the apertures of a stationary tray). Over time, the foulant may bridge over the aperture, partially or fully plugging the aperture. By configuring fractionation tray 12 with upper and lower movable tray decks sandwiching a stationary tray deck, fouling build up on or around the apertures of the stationary tray deck may be partially or fully removed (cleaned) on both top and bottom surfaces as the upper and lower movable tray decks, respectively are moved across the apertures. This can be beneficial in fouling scenarios where foulant has a tendency to build up on both top and bottom surfaces of the tray deck.

Fractionation tray 12 can include a variety of other tray flow control features to control liquid height on and flow across the tray and/or vapor pressure and flow through the apertures of the tray. Typically, fractionation tray 12 may include a downcomer 50 (FIG. 2) that directs liquid having flowed across the tray down to a lower tray or discharge location. A weir 52 may extend above the top surface the tray to set the design liquid height on the fractionation tray during operation. A variety of different downcomer and weir configurations can be used with fractionation tray 12.

In general, downcomer 50 provides a passageway for liquid to pass downwardly from one tray to an underlying tray. In single pass tray arrangements, the downcomers are provided at opposite ends of vertically adjacent trays so the liquid flows completely across one tray from the inlet end to the outlet end before it enters the downcomer for passage to the next lower tray. The liquid then flows in the opposite direction across the lower tray (or in some instances trays that generate a circular flow are utilized such that liquid flows in the same direction on each tray) and enters the associated downcomer for passage to and across lower trays in the same back and forth fashion. In two-pass tray arrangements, the tray is split into two streams which travel in opposite directions on each tray. A center downcomer is provided on every other tray and two end downcomers are placed at opposite ends of intermediate trays to provide the double pass flow pattern. In addition to double pass tray arrangements, alternative multi-pass tray downcomer designs include three and four pass trays. A four pass tray has side and center downcomers on every other tray and has two intermediate or off-center downcomers on the other-alternating trays. The center and intermediate (or off-center) downcomers have liquid flowing from either side. These tray arrangements include chordal downcomer designs as they cut a chord across the tower. Another type of downcomer that can be used is a central downcomer positioned in the middle of the tray deck that can potentially receive liquid from the entire perimeter of the downcomer. These interior hanging downcomers come in various shapes and sizes as in rectangular or circular cross-sectioned downcomers.

Fractionation tray 12 may include a weir 52 positioned at the outlet end of tray to provide a mechanical seal on the upstream downcomer. Weir 52 can also cause liquid to accumulate on the top surface of the tray for enhanced interaction with the vapor bubbling upwardly through the apertures in the tray deck before entering downcomer 50.

The area of the tray deck which contains the apertures in vapor-liquid contact trays in generally referred to as the "active area" of the tray because the vapor-liquid interaction occurs above the tray in this area. The active area typically does not include the area at the inlet end of the tray deck which lies immediately below the outlet of the downcomer which is associated with the overlying tray. This area of the tray below the downcomer outlet is referred to as the downcomer receiving area and is typically a solid plate 54, which receives the vertically flowing discharge from the downcomer and redirects it horizontally to flow across the tray. Although not illustrated in the example of FIG. 2, fractionation tray 12 may include an inlet weir providing a liquid height separation between the downcomer receiving area and the active area of the tray.

In the example of FIG. 2, fractionation tray 12 is illustrated as having a chordal downcomer 50, which can be characterized by a chord, or straight line segment, having endpoints lying on the otherwise circular perimeter of the tray. In alternative implementations, whether implemented as a single-pass tray or multi-pass tray, fractionation tray 12 may have a tubular downcomer 50.

Figure 10:
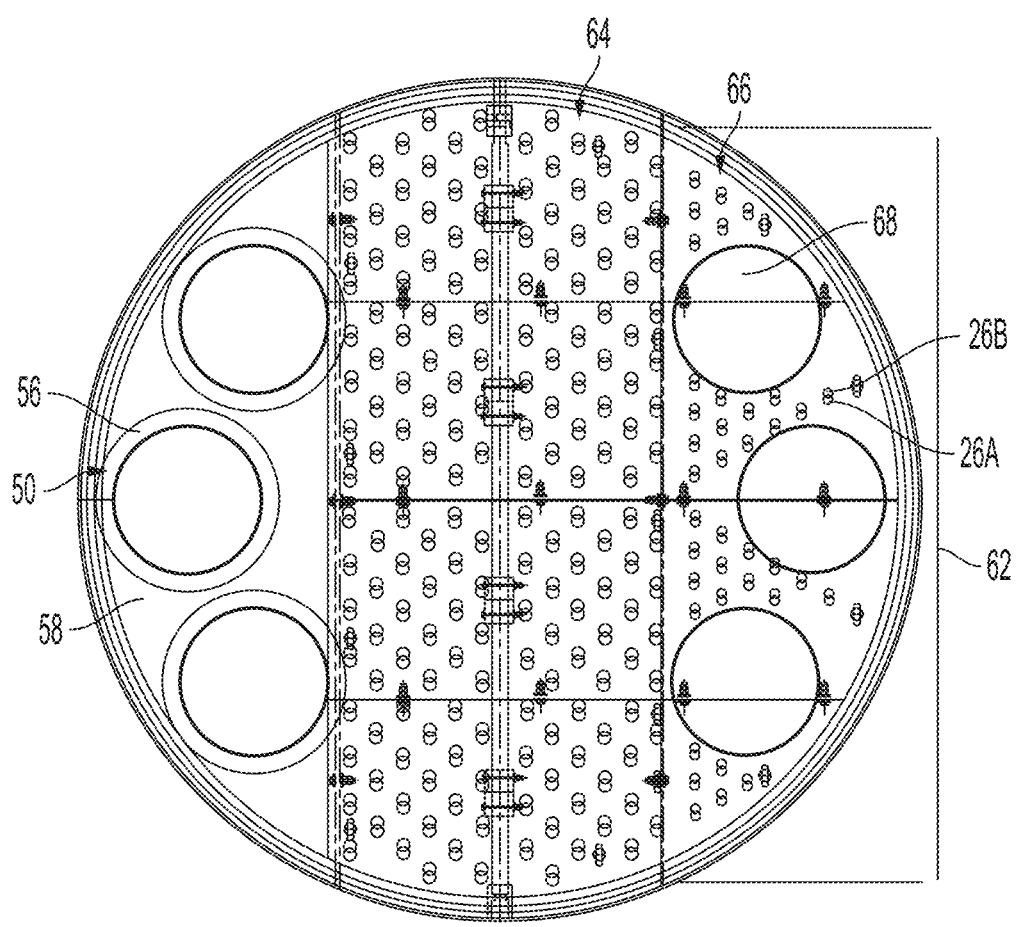
FIGS. 10 and 11 are top and side views, respectively, illustrating an example configuration of the fractionation of FIG. 2 with an example tubular downcomer.
Figure 11:
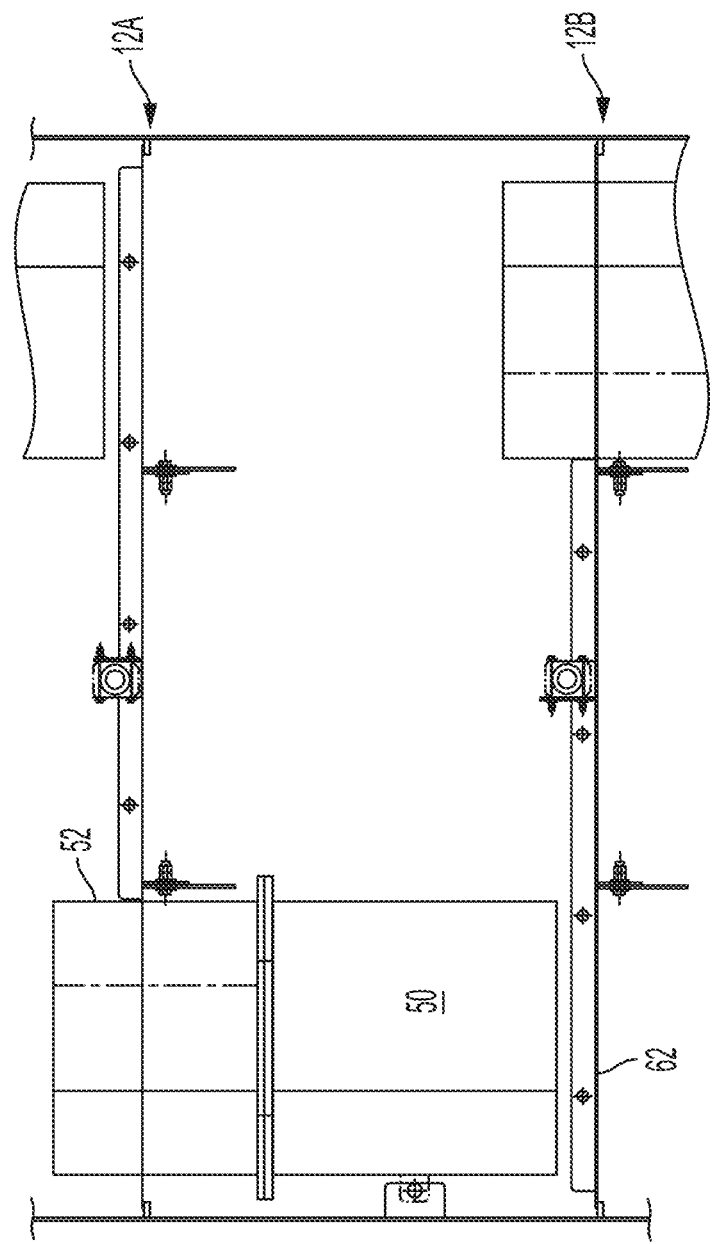

FIGS. 10 and 11 are top and side views, respectively, illustrating an example configuration of fractionation tray 12 with a tubular downcomer 50. When so implemented, downcomer 50 may not be defined by a chord transecting the perimeter of fractionation tray 12 but may instead by defined by a tubular body extending downwardly from fractionation tray 12. Tubular downcomer 50 may be surrounded about its perimeter 56 with sheet material defining the planar surface of fractionation tray 12. In different examples, tubular downcomer 50 may have a polygonal cross-sectional shape (e.g., square, rectangular), an arcuate cross-sectional shape (e.g., circular, oval), or combinations of polygonal and arcuate cross-sectional shapes.

Fractionation tray 12 can be configured with at least one, and optionally multiple (e.g., two, three, or more), tubular downcomers 50. When configured with multiple downcomers as illustrated in FIG. 10, the multiple tubular downcomers may be positioned within a chordal area 58 of fractionation tray 12. The chordal area 58 containing tubular downcomers 50 may or may not include apertures (e.g., 26A and 26B). Configuring fractionation trays 12 with one or more tubular downcomers 50 may be useful for a variety of reasons. For example, configuring fractionation tray 12 with a tubular downcomer 50 may allow the downcomer perimeter to be offset from the sidewall of column housing 14, eliminating a seam weld between the downcomer-column wall interface that may have a tendency to leak. As another example, discussed in greater detail below, configuring fractionation tray 12 with a tubular downcomer 50 may allow apertures (e.g., 26A and/or 26B) to be positioned between adjacent downcomers and/or between the downcomer receiving area 62 of adjacent downcomers (the space of fractionation tray 12 receiving liquid from a downcomer of a tray positioned above). This can increase the active area of fractionation tray 12 for gas-liquid contact and corresponding fractionation.

Independent of the configuration of downcomer 50, in different implementations, downcomer 50 may be directly affixed to fractionation tray 12 or may be affixed to the sidewalls of column housing 14 and fractionation tray 12 positioned in abutting contact with the downcomer. In either case, fractionation tray 12 and, more particularly first tray deck 22 and second tray deck 24, may be constructed as single sections of tray deck material or from multiple sections of tray deck material that are joined together. For example, first tray deck 22 and/or second tray deck 24 may be constructed from two or more sections of tray deck material that are then joined together inside of column housing 14. Each section of tray deck material used to form the resulting tray deck may have a size less than a maximum opening size of a manhole that provides access to an interior of column housing 14. For example, column housing 14 may have one or more manholes having a major dimension of 48 inches or less, such as 36 inches or less, or 24 inches or less. By configuring fractionation tray to be formed of different sections smaller than the manhole providing access to the column housing, the sections may be inserted into the column housing via the manhole installed together inside of the housing. When so configured, the tray sections may be welded together inside the column housing and/or removably join together with bolts, nuts, and/or washers.

A fractionation tray 12 according to disclosure may have additional or different features to control the throughput and performance of the tray. For example, the apertures of fractionation tray 12 have generally been described and illustrated as being implemented in a sieve tray configuration. In other configurations, however, fractionation tray 12 may include bubble caps or valves (e.g., fixed valves, movable valves) to further control vapor flow through the apertures of the tray. When configured with valves, each aperture may be covered by a valve body that has a top surface in one or more downwardly directed support members extending from the top surface of the valve body to the tray surface. The valve body may define one or more vapor discharge openings between the top surface of the valve body and the support members through which vapor extending upwardly through the aperture can accept. For example, a bidirectional slotted cap valve geometry may include a trapezoid having two outlet openings on either side of the through which vapor can discharge.

Figure 8A:
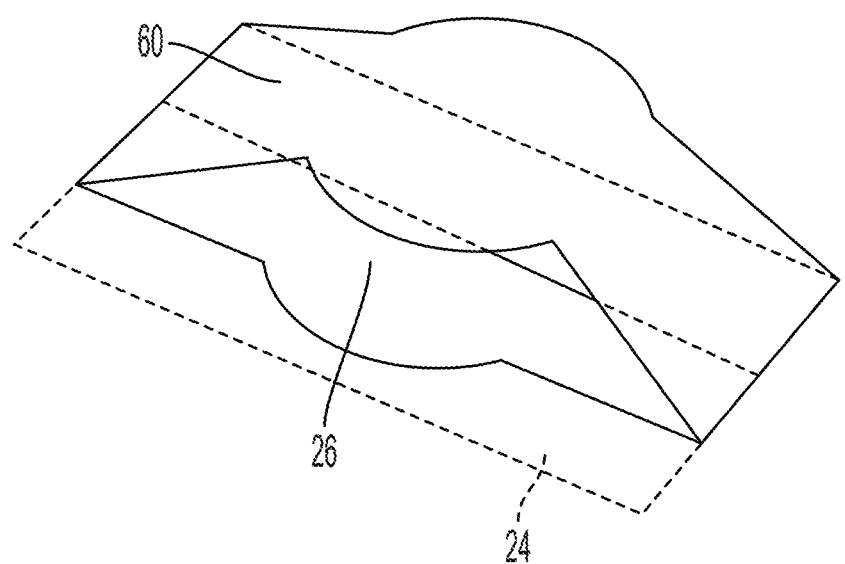
FIGS. 8A and 8B are illustrations of an example valve configuration that may be used on the fractionation tray of FIG. 2.
Figure 8B:
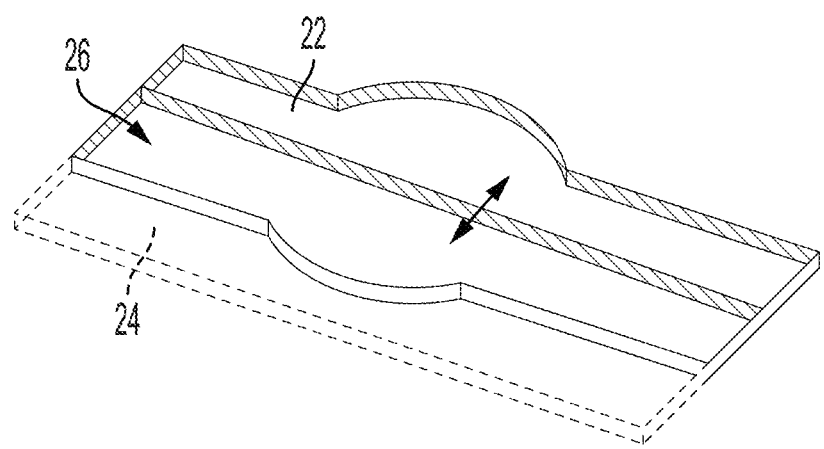

FIGS. 8A and 8B are illustrations of an example valve configuration that may be used on fractionation tray 12. As shown in this example, a valve body 60 is positioned over and aperture 26 to define wedge-shaped vapor-directing slots from which vapor can exit. Valve body 60 projects upwardly from a top surface of the tray deck and, as a result, may be positioned on the uppermost tray deck (e.g., second tray deck 24). Accordingly, to provide a movable tray deck when utilizing an upwardly projecting valve body over the apertures, the lower tray deck (e.g., first tray deck 22) may be movable relative to the upper tray deck. FIG. 8B is a schematic illustration shown with the valve body 60 removed for purposes of conceptually illustrating how the lower tray deck can move relative to the upper tray deck to adjust the open area of the aperture.

Fractionation tray 12, including first tray deck 22 and second tray deck 24, can typically include multiple apertures arrayed across the tray. Each aperture (e.g., or each composite aperture defined by aligned pairs of apertures 26A and 26B extending through the first and second tray deck, respectively) may have the same cross-sectional area (e.g., same diameter), or different apertures extending through fractionation tray 12 may have different sizes from each other.

For example, fractionation tray 12 may include at least a first set of apertures defining a first cross-sectional area and a second set of apertures defining a second cross-sectional area less than the first set of apertures. In some such configurations, the second (smaller) set of apertures may completely close (such that a blanking section completely covers an aperture) before the first (larger) set of apertures complete close when moving first tray deck 22 and second tray deck 24 relative to each other to turndown throughput. This may allow gas-liquid contact through the first (e.g., partially closed) set of apertures but not the second set of apertures. Likewise, the first (larger) set of apertures may begin opening before the second (smaller) set of apertures begins opening. When so configured, the open area of the second set of apertures may vary from completely open (100% open area) to completely shut (0% open area) while the open area of the first set of apertures varies without being completely open or shut (e.g., transitions within a range of 90% open area to 10% open area, such as from 80% open area to 20% open area). This arrangement can provide a second set of apertures that open when additional throughput capacity is needed for fractionation column 10 but that may otherwise be mostly (e.g., greater than 50%) or completely closed while a first set of apertures is at least partially open for lower capacity operation.

When fractionation tray 12 is configured with multiple sets of different sized apertures, the different sized aperture may be located at any desired location across fractionation tray 12 relative to each other. FIG. 10 illustrates one example layout where a first (larger) sized set of apertures 64 are arrayed over the active area of fractionation tray 12. A second (smaller) sized set of apertures 66 are arrayed over downcomer receiving area 62 (e.g., a chordal region of fractionation tray 12 from which an upstream downcomer drops liquid downwardly). In the illustrated example that includes tubular downcomers 50, the area 68 of the upstream downcomer the projects on the receiving area (e.g., visually and/or flow projects without actually contacting the receiving area) is shown devoid of apertures. In other words, the second set of apertures are arrayed around and not over the portion of downcomer receiving area 62 that the upstream downcomer projects liquid onto in the illustrated example.

Whether implemented as a manual actuator 38 or a controlled actuator 38 that receives control signals from a system controller, the actuator can control the relative position of the tray decks to vary the open area of the apertures through fractionation tray 12. In some configurations, fractionation column 10 includes at least one pressure sensor that measures the pressure above a fractionation tray 12 as well as below the fractionation tray. Such differential pressure measurement may be made with using a single pressure sensor that periodically samples from above and below the fractionation tray or using multiple pressure sensors that sense the pressure of the different gas spaces. Using a single pressure sensor that is selectively placed in pressure communication with different pressure spaces via a manifold can be useful to eliminate calibration and/or measurement inconsistencies between different pressure sensors. In either case, however, the differential pressure across the fractionation tray may be measured and the open area through the fractionation tray adjusted based on the determined differential pressure. For example, an operator may set a target pressure drop across fractionation tray 12 and adjust the open area through the tray (by moving the movable tray deck relatively stationary tray deck) until the pressure drop across the tray is substantially equal to the target pressure drop.

In addition to or in lieu of controlling the positioning of the tray decks of fractionation tray 12 based on differential pressure, the movable tray deck may be periodically actuated to perform a cleaning on the fractionation tray. For example, the movable tray deck of fractionation tray 12 may be actuated at least once hour, at least once per 12 hour period, at least once per day, at least once per week, or at least once per month. Periodic movement may have a tendency to dislodge accumulated following on the tray, helping to open the apertures in the tray from blocking fouling. For example, actuator 38 may be periodically actuated to move second tray deck 24 relative to first tray deck 22 from a working position, to a covered and/or uncovered position, and back to the working position. This actuation cycle can cause the second tray deck to sweep across the apertures of the first tray deck and removing accumulated fouling thereover and/or therein.

Figure 9:
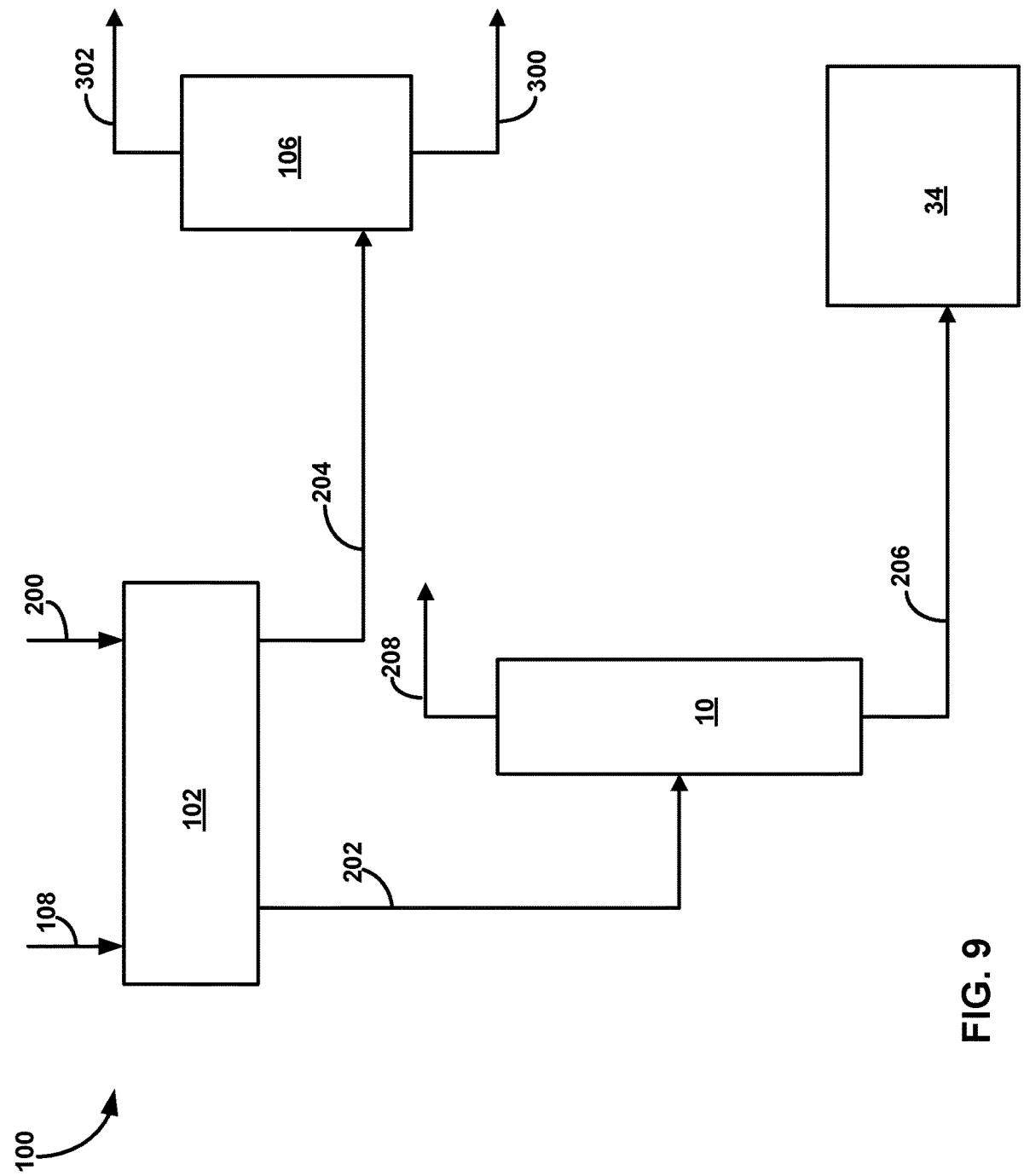
FIG. 9 is a block diagram illustrating an example extraction system that may utilize a fractionation column according to the disclosure.

A fractionation tray and/or column according to the disclosure can be used in a variety of different applications where fractionation of a liquid feed stream is desired. FIG. 9 is a block diagram illustrating an example extraction system 100 according to the disclosure that can utilize fractionation column 10 and fractionation tray 12. System 100 includes an extractor 102, fractionation column 10, and a desolventizer unit 106. In operation, a feedstock 108 containing a material to be extracted is introduced into a feed inlet of the extractor 102 and solvent 200 is introduced into a solvent inlet of the extractor. The feedstock 108 is contacted with the solvent 200 within the extractor 102 to extract oil from the feedstock into the solvent. The extractor can produce a miscella stream 202 containing extracted oil in organic solvent. The extractor can also produce a solvent wet residual solids stream 204 containing residual solid material from the feedstock whose oil content has been extracted.

In the example configuration of system 100, the miscella stream 202 is conveyed to fractionation column 10. FIG. 9 illustrates fractionation column 10 receiving miscella stream 202 directly from extractor 102. In practice, miscella stream 202 may undergo one or more intermediate desolventization steps (e.g., in which solvent is thermally removed from the miscella stream 202) before the partially desolventized miscella stream is received by fractionation column 10 for further desolventization. For example, system 100 may include one or more evaporation and/or other distillation stages, with miscella stream 202 passing through an evaporator (e.g., rising film evaporator) and/or other distillation column during each stage. This can reduce the solvent content and increase the oil content of miscella stream 202 received by fractionation column 10 as compared to if the fractionation column receives the stream directly from extractor 102.

Independent of whether miscella stream 202 undergoes earlier desolventization before being received by fractionation column 10, the miscella stream can be processed within the fractionation column to separate extracted oil from the organic solvent. For example, miscella stream can flow across one or more fractionation trays 12 inside of fractionation column 10 while rising vapor flows through adjustably-sized apertures of the tray for effecting separation. For example, fractionation column 10 may receive steam that vaporizes solvent from the miscella stream 202. Fractionation column 10 can produce an extracted oil stream 206 substantially or entirely devoid of organic solvent and a first recovered solvent stream 208. Organic solvent within the first recovered solvent stream 208 may be mixed with air and/or steam. In some examples, the first recovered solvent stream 208 is passed through a condenser to remove condensable liquids, including recovered solvent, yielding a residual stream of non-condensable exhaust gas. This exhaust gas may contain residual and/or entrained organic solvent that does not condense within the condenser.

Solvent-wet solids stream 204 in the example configuration of FIG. 1 is conveyed to the desolventizer unit 106. The desolventizer unit 106 can dry the solvent wet solids discharged from extractor 102. For example, desolventizer unit 106 may apply heat either directly or indirectly to the solvent wet solids, such as forced air and/or steam, to vaporize solvent from the surface of the solids. The desolventizer unit 106 can produce a dried residual solids stream 300 and second recovered solvent stream 302. The second recovered solvent stream 302 may be passed through a condenser to remove condensable liquids, including recovered solvent from the solvent wet solids, yielding a residual stream of non-condensable exhaust gas. The exhaust gas may contain residual and/or entrained organic solvent that does not condense within the condenser.

Extractor 102 can be implemented using any suitable type of extractor configuration. In different examples, extractor 102 may be an immersion extractor, a percolation extractor, or yet other type of extractor design. Independent of the specific configuration of extractor 102, the extractor may be configured to operate so the feedstock stream 108 and solvent stream 200 flow in countercurrent directions through a housing of the extractor. For example, fresh oil-bearing feedstock 108 may flow through one inlet of the extractor housing while fresh solvent substantially or entirely devoid of extracted oil is passed through a second inlet of the extractor. As solvent travels through the extractor housing from the solvent inlet to the miscella outlet, the solvent can flow in a countercurrent direction to the flow of solid material passing from the feedstock inlet to the residual solids outlet. The solvent can intermix with the oil-bearing material within the extractor, causing oil and/or other extractable components to extract out of the solid feedstock into the solvent. The concentration of extract (e.g., oil) relative to solvent increases from a relatively small extract-to-solvent ratio to a comparatively large extract-to-solvent ratio. Similarly, as the solid feedstock is conveyed in the opposing direction, the concentration of extract in the solid feedstock decreases from a comparatively high concentration at the inlet to a comparatively low concentration at the outlet.

Extractor 102 can process any desired oleaginous feedstock using any suitable extraction fluid. Example types of oleaginous materials that can be processed using extractor 102 include, but are not limited to, soybeans (and/or soy protein concentrate), rapeseed, sunflower seed, peanuts, cottonseed, palm kernels, and corn germ and combinations thereof, as well as other oil-bearing seeds and fruits. Solvents that can be used to extract oil contained within the oleaginous material being processed are generally organic solvents, such as ethanol, acetone, hexane, and/or toluene. Typical oleaginous materials processed using extractor 102 are plant-based materials, yielding a triglyceride vegetable oil as an extracted oil product.

Fractionation column 10 processing miscella stream 202 to separate extracted oil from solvent can be implemented using one or more separation units. For example, fractionation column 10 may be implemented using one or more distillation columns, stripping columns, and/or evaporator units. Fractionation column 10 may be effective to remove substantially all of the organic solvent from the extracted oil in the miscella stream 202. For example, fractionation column 10 may receive miscella stream 202 having from 0.5 weight percent to 5 weight percent solvent, such as from 2.5 weight percent to 3 weight percent solvent. Miscella stream 202 discharging from extractor 102 may have higher concentrations of solvent, but the stream may be processed (e.g., in first and second stage evaporators) before being received by fractionation column 10. In either case, fractionation column 10 can process miscella stream 202 to produce extracted oil stream 206 having less than 3 weight percent organic solvent, such as less than 1 weight percent organic solvent, less than 0.5 weight percent organic solvent, or less than 200 ppm solvent. For example, fractionation column 10 can process miscella stream 202 to produce extracted oil stream 206 having less than 100 ppm solvent, such as less than 50 ppm solvent, or less than 15 ppm solvent.

Desolventizer unit 106 processing residual solids stream 204 can also be implemented using one or more separation units. For example, desolventizer unit 106 may be configured as a desolventizer toaster or other desolventizing device that increases the temperature the solids stream 204. The temperature of the stream may be increased to a temperature above the boiling point of the solvent introduced into extractor 102, causing residual solvent to vaporize. In some configurations, steam is injected into desolventizer unit 106 in addition to or in lieu of any other direct or indirect heating.

Various examples have been described. These and other examples are within the scope of the following claims.

The invention claimed is:

1. A fractionation column comprising:
an undivided column housing having a feed inlet, a liquid outlet, and a gas outlet;
a plurality of fractionation trays contained in the undivided column housing that are vertically spaced from each other, at least one of the plurality of fractionation trays comprising:
a first tray deck that includes apertures, wherein the first tray deck is configured to allow vapor rising in the undivided column housing to pass through the apertures and contact liquid flowing across and/or through the tray deck;
a second tray deck positioned adjacent to the first tray deck, the second tray comprising at least one blanking section devoid of apertures that is movable relative to the apertures of the first tray deck between a covered position in which the apertures of the first tray deck are covered by the at least one blanking section and an uncovered position in which the apertures of the first tray deck are not covered by the at least one blanking section; and
an actuator associated with the at least one of the plurality of fractionation trays that includes the first tray deck and the second tray deck, the actuator being positioned outside of the undivided column housing and being configured to control a shaft extending through a wall of the undivided column housing that is connected to the second tray deck, wherein the actuator is configured to turn the shaft connected to the second tray deck, causing the second tray deck to move linearly relative to the first tray deck.

2. The column of claim 1, wherein:
the second tray deck comprises apertures and the at least one blanking section comprises regions of deck material between the apertures, and
the second tray deck is movable relative to the first tray deck between the covered position and the uncovered position, wherein in the covered position the apertures of the first tray deck are aligned with the regions of deck material of the second tray deck and in the uncovered position the apertures of the first tray deck are aligned with the apertures of the second tray deck.

3. The column of claim 2, wherein the second tray deck is movable through a continuous range of positions from the covered position to the uncovered position to provide continuous adjustment of an open area of the apertures of the first tray deck from being 0% open to 100% open.

4. The column of claim 2, wherein the apertures of the second tray deck are larger than the apertures of the first tray deck, and the at least one blanking section of the second tray deck is sized to cover some but not all of the apertures of the first tray deck.

5. The column of claim 1, wherein the shaft comprises a threaded drive screw and the second tray deck comprises one or more nuts threadingly coupled to the threaded drive screw.

6. The column of claim 1, wherein the shaft comprises a first shaft that extends externally to the undivided column housing and a second shaft internal to the undivided column housing, the first shaft and the second shaft being joined together at a sealed junction.

7. The column of claim 1, further comprising a positioning sensor configured to measure, directly or indirectly, a position of the second tray deck.

8. The column of claim 1, wherein the second tray deck is positioned under the first tray deck and is slidingly attached to the first tray deck.

9. The column of claim 1, wherein the first tray deck is sealed to the undivided column housing about at least a portion of its perimeter, and the second tray deck has a smaller cross-sectional area than the first tray deck and is inset from the undivided column housing.

10. The column of claim 1, wherein one or both of:
the first tray deck further comprises a downcomer, and
the undivided column housing further comprises the downcomer and the first tray deck is attached to the downcomer.

11. The column of claim 10, wherein:
the second tray deck comprises apertures and the at least one blanking section comprises regions of deck material between the apertures,
the apertures of the first tray deck and the apertures of the second tray deck define a first set of apertures having a first cross-sectional area and a second set of apertures having a second cross-sectional area less than the first cross-sectional area, and
the first set of apertures are arrayed over an active area and the second set of apertures are arrayed over a downcomer receiving area and offset from a portion of the downcomer receiving area that an upstream downcomer projects liquid onto.

12. The column of claim 1, wherein the at least one of the plurality of fractionation trays that includes the first tray deck and the second tray deck is configured to receive liquid on its top surface from an upper downcomer, have the liquid pass across the fractionation tray and over one or more weirs while vapor is rising through apertures in the tray, and discharge the liquid through a subsequent downcomer.

13. The column of claim 1, further comprising, for the at least one of the plurality of fractionation trays that includes the first tray deck and the second tray deck,
at least one pressure sensor configured to measure a pressure above the fractionation tray and to measure a pressure below the fractionation tray, and
a controller communicatively coupled to the actuator and the at least one pressure sensor, the controller being configured to:
determine a differential pressure across the fractionation tray based on pressure information received from the at least one pressure sensor, and
control the actuator to adjust an open area through the first tray deck by moving the second tray deck based on the determined differential pressure.

14. The column of claim 1, further comprising, for the at least one of the plurality of fractionation trays that includes the first tray deck and the second tray deck,
> a controller communicatively coupled to the actuator, the controller being configured to periodically move the second tray deck relative to the first tray deck from a working position, to a covered and/or uncovered position, and back to the working position, thereby causing the second tray deck to sweep across the apertures of the first tray deck for removing accumulated fouling.

15. The column of claim 1, wherein multiple of the plurality of fractionation trays contained within the undivided column housing are configured with the first tray deck and the second tray deck.

\* \* \* \* \*